June 27, 1967 W. V. CONNER 3,328,017
REACTION VESSEL FOR PRODUCTION OF PLUTONIUM
Filed May 25, 1965
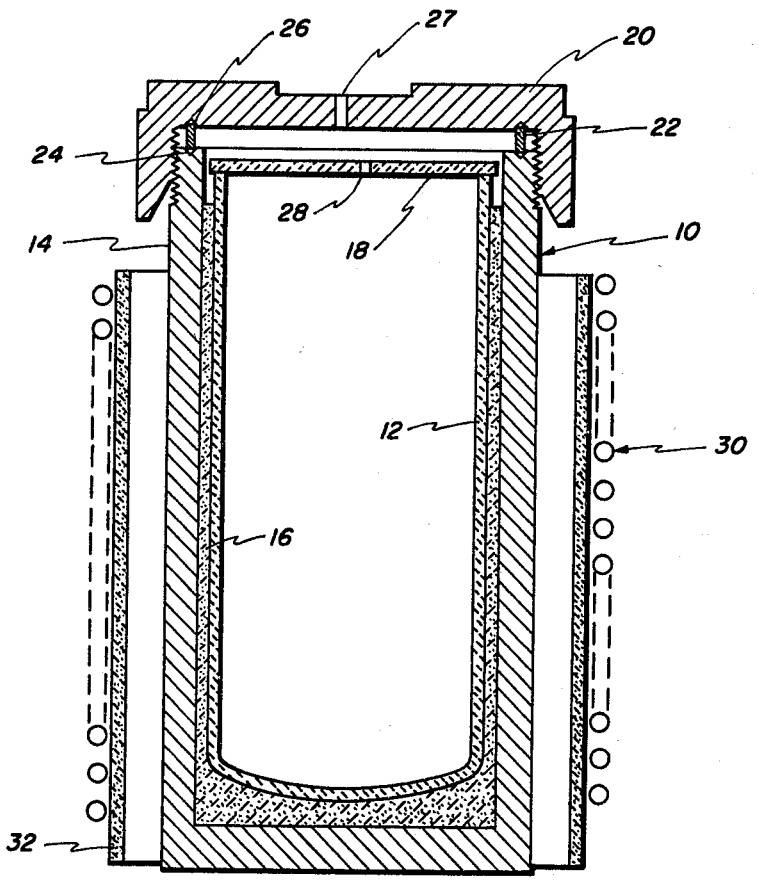
INVENTOR.
William V. Conner
BY
ATTORNEY

United States Patent Office 3,328,017
Patented June 27, 1967

3,328,017
REACTION VESSEL FOR PRODUCTION OF
PLUTONIUM
William V. Conner, Boulder, Colo., assignor to the United
States of America as represented by the United States
Atomic Energy Commission
Filed May 25, 1965, Ser. No. 458,800
2 Claims. (Cl. 266—39)

The present invention relates generally to reaction vessels within which actinide compounds are reduced to actinide metals, and more particularly to a reaction vessel for use in production of plutonium wherein a reusable liner is utilized for successive reductions.

In production of plutonium a chemical reaction of compounds of plutonium with an alkaline earth metal such as calcium may be employed. This reaction is a thermochemical or exothermic reaction which may be initiated by heating a reaction vessel and its contents, and is accompanied by rapidly rising temperatures and pressures within the vessel. The reactants are contained in a refractory crucible which by itself may not be sufficiently strong to withstand severe thermal and mechanical stresses caused by the rapid rise in temperature and pressure within the crucible, consequently allowing reactants to escape from the crucible. In order to support the crucible during the reaction a metal shell or pressure vessel may be placed about the crucible and an annulus or space therebetween filled with loose refractory material, which may be a material similar to that of the crucible. While this construction may provide satisfactory support for the crucible, it has attendant shortcomings or drawbacks which detract from its usefulness. Perhaps the most significant shortcoming or drawback is that such a construction does not provide a reusable liner for the reaction vessel since the lining of loose refractory is removed from the metal pressure vessel along with the crucible and reaction products and consequently a new lining must be formed for each reduction. This process of replacing the lining for each reduction is not only expensive and time consuming as to require a large quantity of reaction vessels to maintain a desirable production scale but also involves the cleanups of the often contaminated loose refractory material between reductions and the difficult placement of the lining about the crucible after the latter is within the pressure vessel. Such lining placement requires the use of a special tool for positioning the crucible in the pressure vessel and guiding the loose material into the annulus between the crucible and pressure vessel with the loose refractory material being tamped by hand or with a mechanical vibrator. Also, refractory material often spills into the crucible during the formation of the liner and must be removed prior to the placement of the charge in the crucible to assure the formation of a properly formed "button" of metal. Another difficulty in using the loose refractory liner is in providing an adequate separation between the bottom of pressure vessel and the crucible to assure minimal heat loss.

Attempting to provide reusable reaction vessels by melting a suitable salt or mixture of salts in the crucible so that the melted salt impregnates the crucible and sand to form a unitary reaction vessel presents a difficulty of recovering the "button" of metal from the slag in that the slag must be drilled until the button is loosened and then the vessel inverted and the button removed.

The present invention aims to obviate or substantially minimize the above mentioned and other shortcomings or difficulties by providing a reaction vessel wherein the liner between the metal pressure vessel and the crucible consists of a preformed unitary structure which facilitates the ready insertion and removal of the crucible therefrom and yet maintains its shape so as to be usable with successive reductions.

An object of the present invention is to provide a new and improved reaction vessel.

Another object of the present invention is to provide a reaction vessel wherein substantial savings in time and money are realized.

A further object of the present invention is to provide a liner for a reaction vessel that is capable of being repeatedly used in high stress environments of reaction vessels.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

For convenience, the detailed description of the invention below will be directed to the reduction of plutonium compounds, such as, for example, plutonium tetrafluoride, in order to present the invention in a clear and facile manner.

In the accompanying drawing:

The figure is a vertical sectional view of reaction vessel embodying the present invention.

There is shown a reaction vessel usable for reductions of plutonium tetrafluoride by an alkaline earth metal such as calcium. The reaction vessel generally indicated at 10 may comprise a tubular cup-like refractory crucible 12 of a suitable material such as magnesium oxide, calcium fluoride, calcium oxide, a mixture of calcium fluoride and calcium oxide, or any other suitable refractory material. For each reduction a crucible such as crucible 12 is placed within a metal shell or pressure vessel 14 of stainless steel or other high strength metal in the form of a tubular receptacle closed at one end and having an inner diameter and length greater than the outer diameter and length of the crucible 12 so that an annulus or space is provided between the crucible and the pressure vessel for receiving the liner 16. This liner 16, which is placed in the pressure vessel prior to the placement of the crucible, is preferably fabricated from a single piece of high quality graphite machined or otherwise formed in the desired configuration. Graphite provides a satisfactory material for the liner in that it is relatively inexpensive, easy to machine, resistant to relatively high temperatures and pressures, and can be processed after its usefulness has come to an end to recover any of the actinide metal which might have adhered to the liner.

The dimensions and configuration of the liner 16 are preferably such that the shape of the outer surface thereof conforms to the inner surface of the pressure vessel 14 while the outer diameter of the liner is approximately the same as the inner diameter of the pressure vessel so that a snug or close fit is attained with the inner surface of the vessel. The inner diameter and shape of the liner similarly conforms with the crucible 12 so that a snug fit is also attained between the liner and the crucible. These close fits between the liner and the vessel and the liner and the crucible are desirable to assure that the thermal and mechanical stresses generated during the reduction do not adversely affect the crucible or liner such as by breakage. Also, the portion of the liner disposed against the bottom of the pressure vessel is preferably thicker than other portions of the liner, as shown, to assure adequate separation between the crucible and the bottom of the pressure vessel for minimizing heat loss from the crucible through the bottom of the pressure vessel.

With the liner 16 and crucible 12 in place within the pressure vessel 14, the open end of the liner 16 may be disposed below the open end of the crucible 14, as shown, so as to facilitate closing and removing the crucible. After the crucible is positioned in the liner a charge of plutonium tetrafluoride and calcium may be placed in the crucible and a closure or lid 18 placed over the open end of the crucible above the side walls of the liner. This lid may be of a refractory material similar to the material of the crucible and be of a diameter greater than the diameter of the crucible 12 so that it overhangs the side walls of the crucible to minimize the possibility of jarring the lid out of position. The reaction vessel may then be closed or sealed by placing a cap 20 over the open end of the pressure vessel 14 and securing the cap to the vessel in any suitable manner such as the threaded engagement shown.

To assure that the reaction vessel is adequately sealed an annular gasket 22, preferably of copper, may be positioned between the end of the pressure vessel 14 and an inner surface of the cap. The gasket 22 is preferably seated in annular V-shaped grooves 24 and 26 in the pressure vessel 14 and cap 20 respectively.

The cap 20 and the lid 18 may be provided with suitable openings such as a centrally located hole 27 through the cap 20 and a hole 28 through the lid 18 so that the reaction vessel may be evacuated and purged with a suitable gas such as argon prior to the reaction to assure that air within the vessel is replaced with argon for obviating or minimizing possibility of violent reactions. The hole 28 in the lid is preferably offset from the center thereof to assure that any material ejected from the crucible through the hole 28 in the crucible lid does not block the hole 27 in the cap.

Heat to initiate the reaction may be supplied by an induction coil 30 disposed about the reaction vessel 10 and separated therefrom by a cylinder 32 of a suitable heat resistant and electrical insulating material to prevent arcing. The size of the charge determines the heating time but a typical charge may be heated for about 10 minutes at 10 kilowatts (kw.) and then increased to 13 kw. until the charge fires which usually requires about 25 to about 30 minutes. Also, it may be desirable to continue the heating for about two minutes after the charge fires to increase the yield and improve plutonium metal-slag separation.

In order to better appreciate the desirability of a reusable liner in a reaction vessel an example of typical reduction is hereinafter set forth. This reduction and the loading and unloading of the reaction vessel are preferably made within the confines of a dry box or similar type enclosure because of the radiation hazard.

The graphite liner 16 is placed in the pressure vessel 14 and the crucible 12 placed in the liner. A reduction charge of plutonium tetrafluoride and calcium is then placed in the crucible. This charge may be thoroughly mixed prior to loading the crucible or if desired the charge may be loaded separately with the calcium at the bottom of the crucible. The lid 18 may then be placed over the crucible, the gasket 22 placed in the grooves 24 and 26, the cap 20 secured to the reaction vessel. The reaction vessel may then be evacuated several times and filled with argon to assure that the air in the vessel is replaced with argon. After the vessel has been purged it may be inductively heated in the induction coil 30 to initiate the thermochemical reaction. The reaction proceeds very rapidly after its initiation and may reach temperatures up to about 1600° C. in a matter of seconds.

Upon completion of the reduction the vessel is allowed to cool before it is opened and the crucible 12 removed from the intact liner 16. The reaction products may then be removed from the crucible and the button of plutonium separated from the slag. After removing the crucible from the vessel another crucible or the same crucible, if the latter is not damaged during the reduction or the subsequent removal of the reaction products therefrom, may then be placed in the liner of the vessel. The crucible may then be loaded with a similar or different reduction charge and the above reaction repeated. This sequence may be repeated again and again without disturbing the vessel or liner.

Materials such as stainless steel and tantalum are not as durable as graphite for liner material as they are relatively difficult to machine and not easily processed to recover actinides adhering to such a metal liner, after its usefulness as a liner ends.

It will be seen that the present invention provides significant contributions to the art in that the production of actinide metals by using reaction vessels incorporating the novel reusable liner is significantly increased and overall expense substantially reduced. Also, the time between successive reductions is significantly reduced in that upon completion of a reduction the crucible may be removed and immediately replaced with another crucible and charge to repeat the reduction without having to reform the liner such as with the loose refractory material or leaving the reaction products in the vessel until the button is loosened by drilling the slag. While the cap 20 is shown secured to the pressure vessel 14 by a threaded engagement, it is to be understood that other constructions may be utilized to close or seal the reaction vessel. For example, the threaded sections on the cap and pressure vessel may be omitted and the pressure vessel 14 disposed on a suitable vertical moving ram assembly in a dry box or similar enclosure while the cap is maintained in a fixed position at the upper part of a dry box. Thus, to seal the reaction vessel, the ram may be activated to move the loaded pressure vessel and a copper gasket into a sealing relationship with the fixed cap.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A reaction vessel for production of plutonium comprising the combination of a charge-containing crucible of refractory material, a pressure vessel having upright side walls and a bottom wall housing said crucible in spaced relationship to the walls of said vessel, a rigid shape-retaining reusable unitary liner consisting of graphite intermediate and abutting against adjacently disposed portions of said crucible and pressure vessel with said liner having upright side walls of height less than adjacent side walls of said crucible and a bottom wall substantially thicker than said liner side walls, a lid of refractory material having an aperture therethrough adjacent a central portion thereof and a diameter greater than an outer diameter of said crucible carried by uppermost ends of the crucible side walls and closing said crucible, said side walls of said pressure vessel having height greater than the side walls of said crucible, a removable closure having an aperture therethrough laterally offset from the aperture in said lid overlying uppermost ends of said pressure vessel side walls and vertically spaced from said lid, means for sealing said removable closure to said pressure vessel.

2. A reaction vessel as claimed in claim 1, wherein means for sealing said removable closure comprises said pressure vessel and said removable closure having annular vertically aligned generally V-shaped notches in adjacently disposed surfaces and an annular copper gasket disposed in said notches.

References Cited

UNITED STATES PATENTS

| | | | |
|---|---|---|---|
| 1,518,818 | 12/1924 | Rietz | 266—39 |
| 2,465,822 | 3/1949 | South | 263—48 |
| 2,665,223 | 1/1954 | Clough et al. | 266—43 X |
| 3,245,674 | 4/1966 | Baer et al. | 266—39 |

FOREIGN PATENTS 846,890  9/1939  France.

J. SPENCER OVERHOLSER, *Primary Examiner.*

E. MAR, *Assistant Examiner.*